US006348168B1

(12) United States Patent
Lowrance et al.

(10) Patent No.: US 6,348,168 B1
(45) Date of Patent: Feb. 19, 2002

(54) METHOD FOR PREPARING PRE-INKED IMPRESSION MEMBERS FOR MARKING DEVICES

(75) Inventors: Bobby Kenneth Lowrance, Augusta, KS (US); John Daniel Ward, Jr., North Little Rock, AR (US); Steven J. Sculler, Manalapan, NJ (US)

(73) Assignee: M&R Marking Systems, Inc., Piscataway, NJ (US)

( * ) Notice: Subject to any disclaimer, the term of this patent is extended or adjusted under 35 U.S.C. 154(b) by 0 days.

(21) Appl. No.: 09/444,594

(22) Filed: Nov. 22, 1999

Related U.S. Application Data

(63) Continuation of application No. 08/350,509, filed on Dec. 6, 1994, now Pat. No. 6,007,751, which is a continuation of application No. 07/942,588, filed on Sep. 9, 1992, now abandoned.

(51) Int. Cl.[7] .............................................. B29C 67/04
(52) U.S. Cl. ....................................... 264/112; 264/126
(58) Field of Search ................................. 264/112, 126

(56) References Cited

U.S. PATENT DOCUMENTS 2,777,824 A * 1/1957 Leeds .......................... 521/52
3,055,297 A * 9/1962 Leeds .......................... 101/327
3,336,244 A * 8/1967 Rockoff ....................... 521/135
3,408,436 A * 10/1968 Cubitt ......................... 264/338
3,479,952 A * 11/1969 Bernardi et al. ......... 101/401.1
3,594,244 A * 7/1971 MacKinnon et al. ........ 264/126
3,801,059 A * 4/1974 Lippold ....................... 249/139
3,846,525 A * 11/1974 Kinne et al. ............... 264/46.5
3,971,315 A * 7/1976 Hansen ........................ 101/333
3,987,137 A * 10/1976 Neumann et al. ........... 264/113
4,091,914 A * 5/1978 Stipanuk .................. 400/196.1
4,226,886 A * 10/1980 Lakes .......................... 428/304
4,279,852 A * 7/1981 Engelmann ................. 264/338
4,306,498 A * 12/1981 Fujimura .................... 101/333
4,336,767 A * 6/1982 Wada ......................... 118/264
4,604,045 A * 8/1986 Black .......................... 425/575
4,927,695 A * 5/1990 Ooms et al. ................ 428/159
5,049,432 A * 9/1991 Ooms et al. ................ 264/112
5,277,721 A * 1/1994 Ooms .......................... 156/64

* cited by examiner

*Primary Examiner*—Allan R. Kuhns
(74) *Attorney, Agent, or Firm*—Lerner, David, Littenberg, Krumholz & Mentlik, LLP

(57) ABSTRACT

Pre-inked impression members for hand stamps are made from a gel or premix of thermoplastic resin particles and liquid ink with use of a disposable molding device comprising a matrix board that is recessed in its molding area with cavities to form inked indicia of the impression members and has a peripheral surface area to which is adhered fluid-tight, and entirely about the molding area, an upright rigid wall means comprising a structure of fiberboard, wood, hard resin or other suitable material shaped to a height corresponding to the desired thickness of the impression members. As another feature, during the heating for curing of a layer of premix formed over the molding area of a matrix board, the layer of premix is confined in place by a covering means, applied over it and held under pressure, which comprises, together preferably with overlaid pliable ink-absorbent material, e.g., plural cut sheets of newspaper, a pliable parting sheet, such for example as a sheet of emery cloth, coated on a side thereof contacting the layer of premix with a substantially resin-impermeable yet ink-permeable layer of fine particles nonadherent to the resin of said premix.

5 Claims, 3 Drawing Sheets

FIG. 1
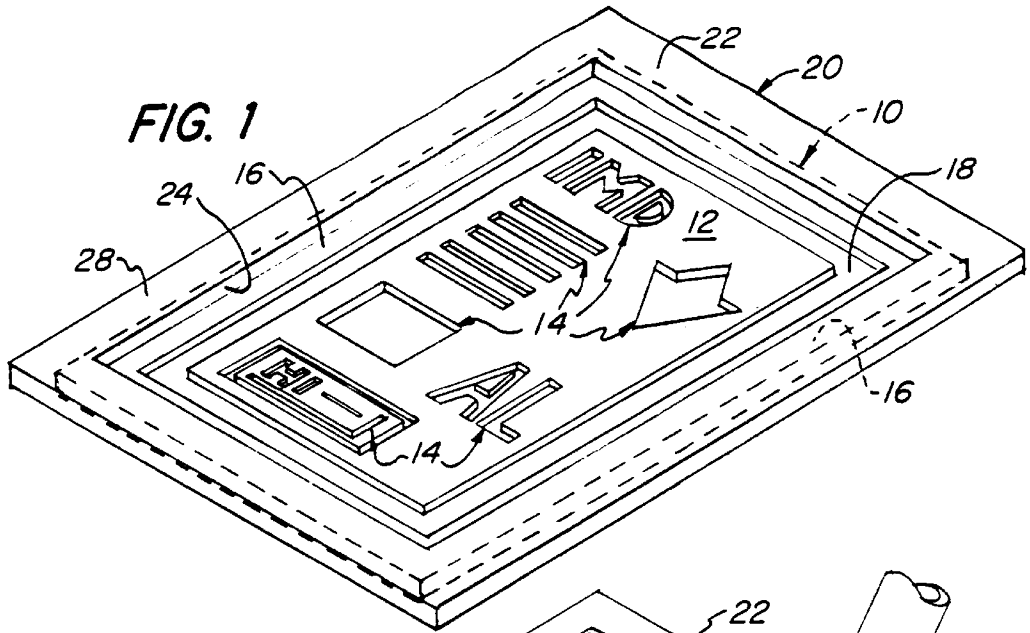
FIG. 2
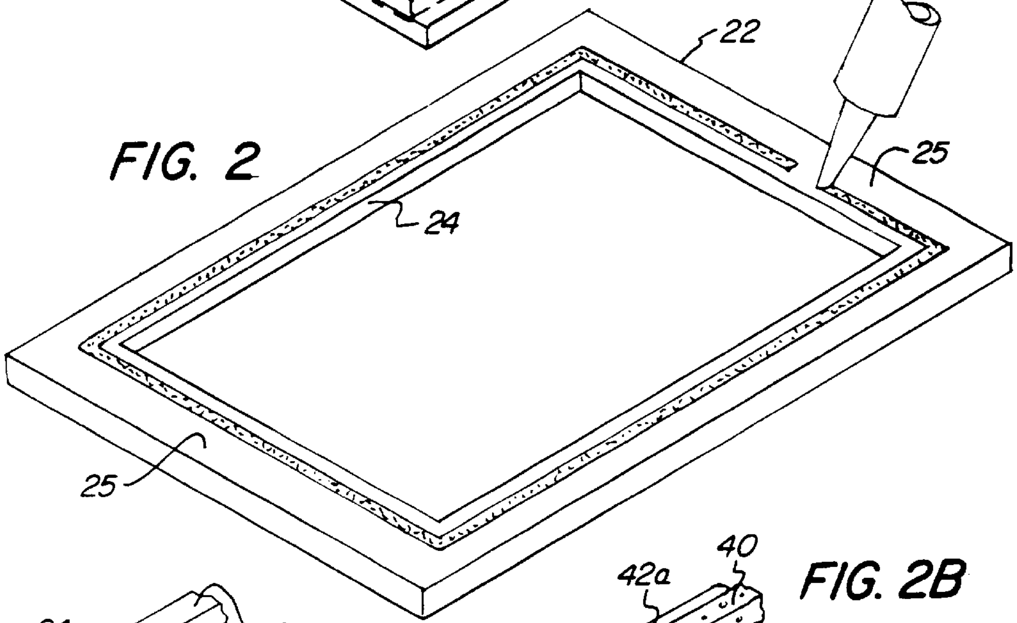
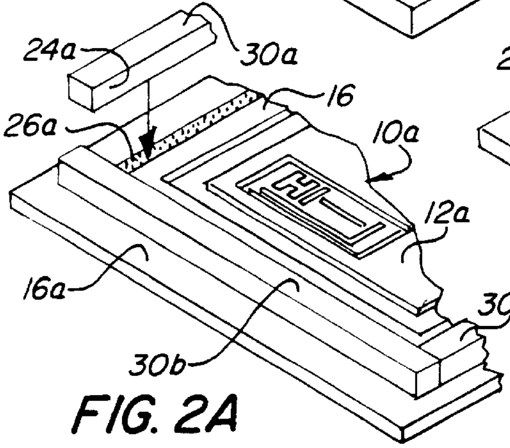
FIG. 2A
FIG. 2B
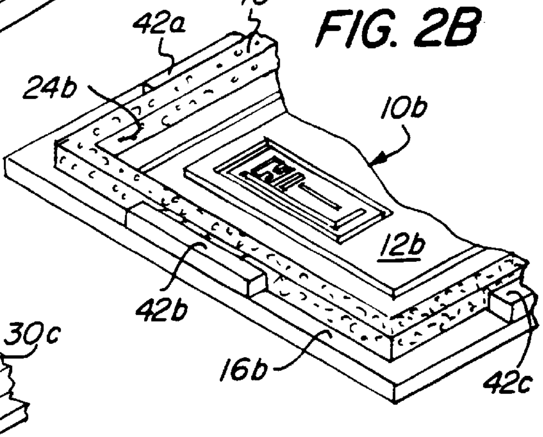

FIG. 6
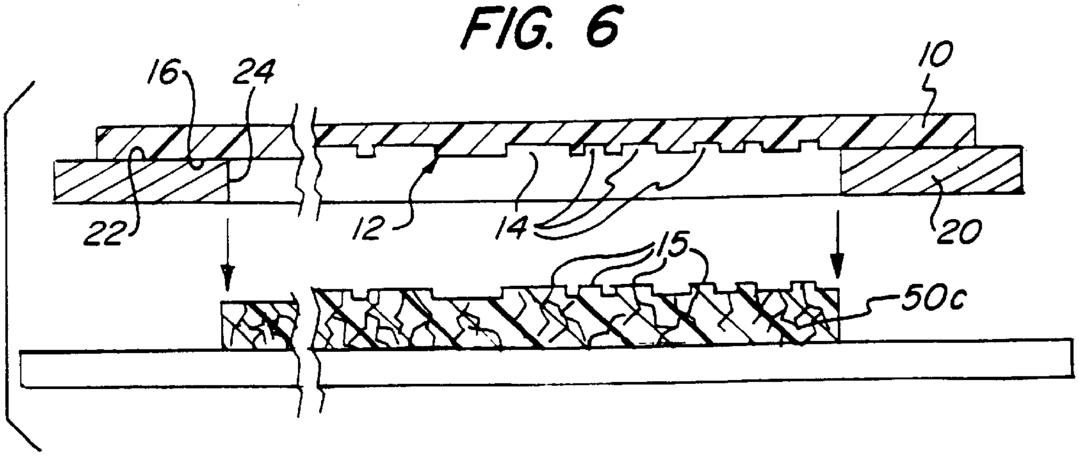
FIG. 7
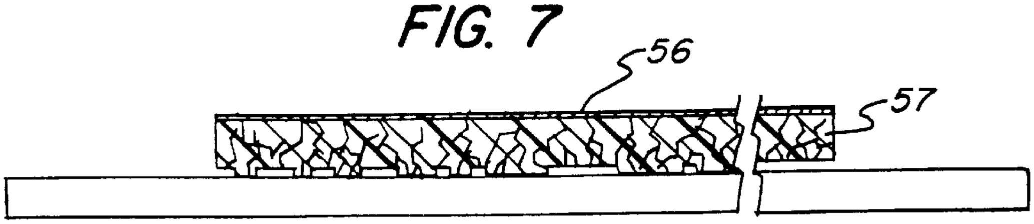
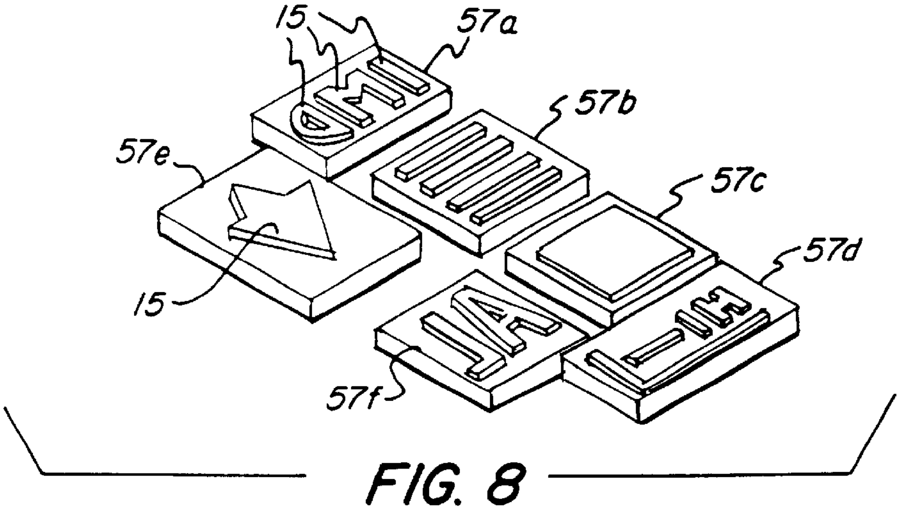
FIG. 8

METHOD FOR PREPARING PRE-INKED IMPRESSION MEMBERS FOR MARKING DEVICES

This application is a continuation of application Ser. No. 08/350,509 filed on Dec. 6, 1994, now U.S. Pat. No. 6,007,751, which is a continuation of application Ser. No. 07/942,588, filed Sep. 9, 1992, now abandoned. This invention relates to a method of preparing inked impression members for marking devices such as hand stamps and to means for carrying out the method.

This invention relates to a method of preparing inked impression members for marking devices such as hand stamps and to means for carrying out the method.

Hand stamps and other marking devices have long been known in which the impression members as manufactured are permeated with ink so that their respective indicia or stamp elements, i.e., the protruding characters or relief elements that are to be imprinted by their use, will give the desired markings in great numbers of impressions and over long period of time without need for re-inking them.

The pre-inked impression member typically is a microporous resin structure made from a gelatinous premix, often referred to as "premix" or as "gel", consisting principally of heat-coalesceable thermoplastic resin particles and liquid ink. The premix is heated while confined under pressure in a molding space so that the resin particles fuse together to form a resilient microporous network that contains the ink yet is capable of releasing ink through protruding indicia of the molding when pressed against a surface to be marked.

Such impression members traditionally have been manufactured by the use of a matrix board together with metal devices termed a "casting chase". The matrix board typically is a substantially rigid board recessed on one side with sets of cavities complementary in shape to the sets of indicia, or stamp elements, required for the impression members of a plurality of hand stamps. The casting chase includes a flat metal base, a rectangular metal frame and a flat metal lid. In use, a prepared matrix board is placed onto the metal base inside its peripheral edges. The frame then is laid over marginal portions of the matrix board, protruding from them, and is clamped tightly in place, thus also clamping the matrix board onto the base, as by bolts or screws extending between confronting edge portions of the base and the frame.

Then a quantity of the gelatinous premix is poured onto the matrix board and worked into its cavities, and is followed by a further quantity to form a layer of premix filling the space over the matrix board inside the frame. Then the premix layer is overlaid by a covering means adapted to confine the layer in place, which means may comprise pliable sheet material that is either absorptive or non-absorptive to components of the premix; and the metal lid is placed on top.

Then the prepared chase assembly is placed in heating equipment, such as between heated platens of a press often called a "vulcanizer", or in an oven, for a "cooking" or curing stage of the process. In that stage, typically, the resin particles in the layer of premix fuse together into a shaped ink-containing elastomeric structure, as mentioned above, while being held at a suitably elevated temperature and being confined in place by pressure applied to the chase assembly via the platens or plates bearing oppositely against its base and the lid.

Following the curing stage, the chase assembly may be removed from the press or oven, and cooled and opened for recovery of the cured product. During the processing, typically, some of the ink and some resin will have exuded from the premix layer into the overlaid covering material and onto some parts of the metal chase devices, and will to some extent have become integrally joined to the cured product. Consequently, it sometimes is difficult to separate the covering material and the chase devices from the cured product without tearing or otherwise marring the product. Also, time-consuming and costly cleaning operations, often with the use of solvents potentially harmful to the environment, are involved for cleaning the chase devices to prepare them for reuse with another matrix board in another molding operation.

It is an object of the present invention to provide a method and means for the manufacture of pre-inked impression members required for hand stamps and like marking devices, which can be utilized effectively by persons relatively inexperienced or untrained in such operations.

Another object of the invention is to provide a method and means for such manufacture whereby mechanical clamping or fastening operations as involved in the use of metal casting chase devices, and cleaning operations required for their reuse, may be avoided.

A further object is to provide a method and means for such manufacture whereby the confining of a layer of premix during the curing stage of the manufacturing process can be effected with little or no exudation of resin from the layer, though with some exudation of the ink and absorption of it in overlaid covering material, and whereby, after the curing, the covering means employed is easily removable from the cured layer without adhering to it so as to cause tearing or other marring of the product.

According to the present invention, a substantially rigid matrix board is formed with a molding area containing in usual manner engraved or impressed cavities complementary in shape to the indicia, or stamp elements, required for certain pre-inked impression members, and the matrix board also presents a peripheral surface area onto which an upright rigid wall means composed essentially of relatively inexpensive material and extending entirely about the molding area is adhered so as to delineate and border fluid-tight a molding space corresponding substantially in height to the thickness of the required impression members.

The molding space is filled with a premix consisting principally of heat-coalesceable thermoplastic resin particles and liquid ink—preferably after first rubbing such premix into the cavities in the matrix board. Then a covering means is placed over the wall means and the premix layer, for confining the premix essentially to the molding space during a curing of the premix at elevated temperature. And then, while the covering means is held in place under elevated pressure, the assembly is heated so as to convert the layer of premix into a resilient ink-containing microporous resin structure. This structure, upon being cooled and separated from the covering means and the matrix board, can be cut or otherwise subdivided into pieces constituting the required pre-inked impression members.

By virtue of the utilization of a matrix board having a peripheral surface area to which an upright wall means made of disposable, preferably biodegradable material is applied and adhered fluid-tight so as to delineate a molding space, the mechanical clamping or fastening operations involved in the use of metal chase devices are avoided. Further, the used matrix board with adhered wall means, after removal of the molded product, can simply be discarded, burned or otherwise disposed of economically—without need for any cleaning operations or any use and disposal of potentially polluting solvents as in prior practices. If on the other hand, as occasionally may happen, it is desired to duplicate or re-make a certain set of impression members, the used matrix board with its adhered upright wall means can be used again for another molding operation.

The adhered wall means can be composed, for instance, of a rigid compressed fibrous composition, such as fiberboard, or rigid strips of wood or of a biodegradable synthetic resin material, or even of a compressible material, such as a foamed plastic, if employed with rigid bearer means for limiting its compression.

According to another feature of the invention, it has been found advantageous to utilize, for covering and confining under pressure the layer of premix while it is being heated for the curing at elevated temperature, a covering means that comprises a pliable parting sheet coated on a side thereof contacting the layer of premix with a substantially resin-impermeable yet ink-permeable layer of fine particles, such, for example, as particles of emery, fine sand or other fine mineral grits, or fine glass beads, that are substantially non-adherent to the resin of the premix.

A covering means so constituted enables the curing of the layer of premix to be effected with little or no exudation of the resin, though with some exudation of the ink, from the premix layer. Further, it enables easy removal of the covering means from the cured microporous layer without causing a tear or other marring of the product. In the use of this feature, the ink exuded through the parting sheet can be collected and removed effectively by having provided additionally in the covering means suitably ink-absorbent material overlying the parting sheet, such, for instance, as a large number of layers or sheets of a readily available, inexpensive absorbent material such as newsprint or newspaper.

Other objects, features and advantages of the invention will be evident from the following detailed description and the accompanying drawings of illustrative embodiments of the invention.

BRIEF DESCRIPTION OF THE DRAWINGS

FIG. 1 is a perspective view of a premix molding device according to the invention, including a matrix board having upright wall means adhered to its peripheral surface;

FIG. 2 is a perspective view of a wall member for a molding device according to FIG. 1, showing a continuous strip of adhesive being applied to the underside of the wall member prior to inverting it to apply and adhere it to the matrix board;

FIG. 2A and FIG. 2B schematically illustrate other embodiments of a molding device according to the invention;

FIG. 6 schematically illustrates a manner of removal from the molding device of the ink-containing microporous resin structure produced by the heating operation;

FIG. 7 schematically illustrates the same product as inverted and covered on its backside with a backing and sealing layer; and FIG. 8 schematically illustrates a variety of pre-inked impression members for hand stamps, as obtained by cutting or otherwise subdividing the product shown in FIG. 7 into pieces respectively presenting in relief the indicia required for the stamps.

DETAILED DESCRIPTION OF THE INVENTION

Figure 3:
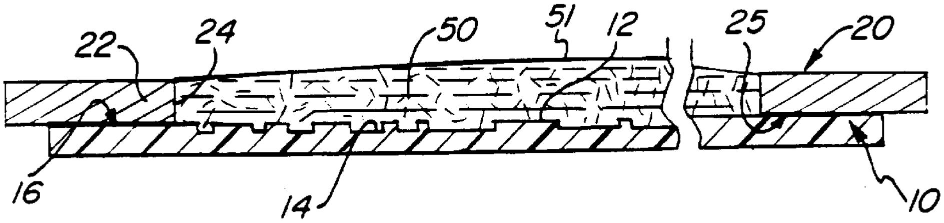
FIG. 3 is a cross-sectional view, partly broken away, of a molding device according to FIG. 1 having its cavities and molding space filled with a layer of premix.

FIG. 1 and FIG. 2 illustrate components of a molding device 20 according to the invention. A matrix board 10 made with a surface layer of tough thermoplastic resin has a molding area 12 of that layer impressed at elevated temperature in usual manner with sets of cavities or engravings, such for instance as those illustrated at 14 in FIG. 1, which are complementary in shape to the indicia, or stamp elements, required for the impression members of a certain plurality of hand stamps. The board 10 also has a peripheral surface area 16 that extends entirely about the molding area 12, and an upright rigid wall means 22 is adhered to area 16 so as to delineate and border fluid-tight a molding space the height of which, as determined by that of upright wall side 24, corresponds substantially to the required thickness of the impression members to be produced.

The wall means 22 comprises, for instance, a unitary member, or if desired strips joined into a similar formation, composed of a compressed fibrous composition, such for example, as the fiberboard known by the trademark name "Masonite". Wall member 22 is shaped so as to overlie and be easily adherable by adhesive to the peripheral surface area 16 of the matrix board.

As illustrated in FIG. 2, a continuous narrow strip or bead 26 of a strong heat-resistant adhesive, such for example as a cyanoacrylate adhesive like that known as "Krazy Glue" or "LOCKTITE 499", is applied to the underside 25 of member 22, whereupon the wall member is inverted and its underside area bearing the adhesive is placed and pressed evenly against the peripheral surface area 16 of the matrix board. In this way, a pressure-resistant fluid-tight seal is provided entirely about the molding area 12 along the interface of wall member 22 and the periphery of the matrix board.

It sometimes is desirable, as when a matrix board may have warped when impressed with its sets of cavities, to press member 22 with the applied adhesive and board area 16 together between press platens under elevated pressure. This aids even adherence and sealing of the wall means.

The molding device 20 is prepared for a molding operation by filling a gelatinous premix of heat-coalesceable resin particles and liquid ink first into the cavities 14 and then up to substantially the full height of the molding space inside the upright side face 24 of wall member 22. A layer 50 of premix (FIG. 3) is thus formed in device 20, preferably up to a meniscus 51 slightly higher than wall 24. The premix may be selected from a variety of compositions known for the manufacture of pre-inked stamp impression members. A suitable composition is known commercially, for example, as "Royal Mark Pre-Ink Gel".

Figure 4:
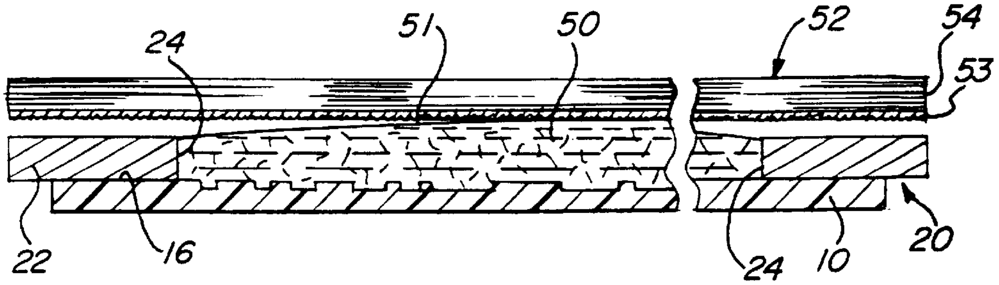
FIG. 4 is a cross-sectional view, partly broken away, showing the assembly of FIG. 3 with covering means applied over the wall means and the premix in accordance with the invention.

As illustrated in FIG. 4, the layer 50 of premix is covered and to be confined by a covering means generally denoted by numeral 52, which is placed over the wall member 22 and against the layer 50 filled into the molding device. The covering means advantageously is selected so that when the layer of premix is heated to fuse together its mutually contacting resin particles, the solids such as resin present in the layer will not exude away into or through the covering means; yet a surplus of ink can exude from the layer as the "cooking" or curing of it takes place.

The covering means 52 advantageously comprises according to the invention a parting sheet 53 coated on a side thereof contacting the premix layer 50 with a substantially resin-impermeable yet ink-permeable layer of fine particles substantially non-adherent to the resin of the premix. Sheet 53 may be, for example, a sheet of an emery cloth identified commercially as Norton K622 Emery Cloth. Additionally, for collecting and disposing of ink that can exude through the sheet 53 when layer 50 and covering means 52 are heated and confined under pressure, the parting sheet 53 is overlaid by numerous layers 54 of ink-absorbent material, such for example as sheets of newspaper or newsprint. As many as 8 to 16 cut sheets of such material may be utilized for the ink-absorbent layers.

Figure 5:
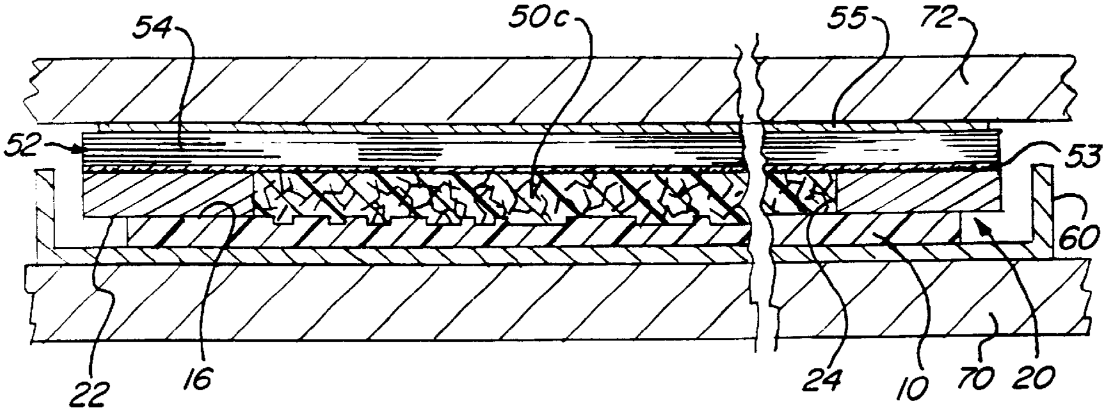
FIG. 5 is a cross-sectional view, partly broken away, schematically illustrating the assembly of FIG. 4 as placed in a tray and being held under pressure between platens of a press, such as in a vulcanizer, during the heating operation for "cooking," or curing, the layer of premix.

The assembly of molding device 20, premix layer 50 and covering means 52, desirably after being placed or prepared in a tray 60 to catch any overflow or spilling and having a rigid lid 55 placed over it, is ready to be heated and confined under pressure for converting layer 50 into the desired shaped ink-containing microporous resin structure. The assembly may be so heated and confined, as illustrated in FIG. 5, between heated press platens 70 and 72 such as those of a vulcanizer.

The assembly, for instance, may be heated for about 11 to 14 minutes under a pressing force of about 4,000 pounds and at a temperature of about 260° F.

An ink-containing microporous resin structure in the form of a slab 50*c* results from the heating of the premix layer 50. The pressure applied by the press via the covering means during the heating keeps the layer 50 confined inside the molding space bordered by area 12 of the matrix board, wall means 20 and the parting sheet 53 of the covering means 52.

Upon completion of the premix curing stage, the matrix board assembly may be removed from the heating press or oven, and allowed to cool. The covering means 52 may be removed before or after the cooling. Upon cooling of the assembly the molded slab structure 50*c* can be removed by freeing its side edge from wall side face 24 and working it as a unit out of the molding space. The slab structure presents in relief ink-containing indicia 15 (FIG. 6) complementary in shape to the cavities 14 in the matrix board 10. As illustrated in FIG. 7, the back side of the product, i.e., its side opposite the side presenting the indicia, may if so desired be covered and sealed by a backing and sealing layer 56 adhered to it.

The resulting slab structure 57 can be cut or otherwise subdivided into pieces, such as those illustrated at 57*a* through 57*f* in FIG. 8, for use as the respective pre-inked impression members of a variety of required hand stamps. The protruding indicia of each impression member will continue to produce clear ink markings of corresponding shape on surfaces to be stamped through great numbers of pressings of them against such surfaces.

The used molding device composed of wall means 22 adhered to matrix board 10 ordinarily will not be reused, and may simply be discarded or disposed of in a suitable manner.

The use according to the invention of covering means comprising a tough pliable parting sheet coated with a substantially resin-impermeable yet ink-permeable layer of fine hard particles non-adherent to the premix resin is advantageous in connection not only with the use of a premix molding device as disclosed herein but also with the use of metal casting chase devices for making pre-inked impression members for hand stamps.

In the alternative embodiment of the invention illustrated in FIG. 2A, plural rigid strips 30*a*, 30*b*, 30*c*, etc. composed essentially of organic matter such as wood, fiberboard or a hard synthetic resin are fitted and adhered together and, through adhesive 26*a*, adhered to peripheral surface area 16*a* of a matrix board 10*a* so as to delineate and border fluid-tight, inside upright wall face 24*a*, a molding space of desired depth encompassing molding area 12*a* of the matrix board. A disposable molding device provided in this way can serve for the functions and purposes described above with reference to the embodiment shown in FIGS. 1 and 2.

Another embodiment of the invention, as illustrated in FIG. 2B, makes use of an upright wall means formed fluid-tight on the peripheral surface area 16*b* of matrix board 10*b*, entirely about its molding area 12*b*, by applying to area 16*b* a continuous strip 40 of a foamed plastic composition that adheres to the board material. The strip 40 is compressible and is normally higher along its upright inner wall face 24*b* than the height required in the molding space that it borders. Additionally, this wall means includes rigid bearer strips, such as pieces 42*a*, 42*b*, 42*c*, etc., of wood, fiberboard or hard synthetic resin, which are made to the height required in the molding space and are adhered to the peripheral area 16*b* outside the foamed plastic strip 40.

In the use of such a molding device, the molding space inside wall face 24*b* may be filled with a layer of premix up to a desired level near but below the top of the foam strip 40. Then when a covering means over the layer and a rigid lid are applied and the assembly is pressed and heated between press platens as previously described, the foamed plastic strip 40, under the pressure applied from the platens via the covering means, is compressed to the height predetermined by the thickness of the bearer strips.

The present invention is not restricted to details or particulars of the foregoing description, or of the accompanying drawings, except as may be required for fair interpretation of the appended claims.

What is claimed is:

1. In a method of preparing pre-inked impression members for marking devices such as hand stamps, which comprises providing a molding device delineating a molding space open at its top and having in its bottom cavities complementary in shape to desired indicia of said impression members, filling said cavities and said molding space with a layer of a gelatinous premix of heat-coalesceable thermoplastic resin particles and liquid ink, placing over said space and against said layer of premix covering means capable of confining solids in said layer essentially to the boundaries of said molding space upon heating of said layer, while holding said covering means in place under pressure, heating said layer so as to convert it by fusion of said resin particles into a resilient ink-containing microporous resin structure, and after said heating removing said covering means and recovering the molded product, the improvement wherein said covering means comprises a pliable parting sheet coated on a side thereof contacting said layer of premix with a substantially resin-impermeable yet ink-permeable layer of fine particles substantially non-adherent to the resin of said premix.

2. A method according to claim 1, said covering means further comprising at least one layer of ink-absorbent material overlying said parting sheet.

3. A method according to claim 1, said parting sheet being a sheet of emery cloth.

4. A method according to claim 2, said ink-absorbent material being newspaper or newsprint.

5. A method according to claim 4, said parting being a sheet of emery cloth.

* * * * *